United States Patent [19]

Epstein

[11] Patent Number: 4,604,684
[45] Date of Patent: Aug. 5, 1986

[54] DIGITAL COMPUTER HAVING UNIQUE INSTRUCTION DECODING LOGIC
[75] Inventor: David I. Epstein, Framingham, Mass.
[73] Assignee: Data General Corp., Westborough, Mass.
[21] Appl. No.: 552,207
[22] Filed: Nov. 15, 1983
[51] Int. Cl.[4] .............................................. G06F 9/28
[52] U.S. Cl. .................................................. 364/200
[58] Field of Search ... 364/200 MS File, 900 MS File

[56] References Cited
U.S. PATENT DOCUMENTS
4,354,228 10/1982 Moore et al. .................... 364/200

Primary Examiner—Raulfe B. Zache
Attorney, Agent, or Firm—Gerald Cechony; Joel Wall

[57] ABSTRACT

Method and apparatus for improving instruction decoding in a microcode-controlled digital computer system. The microinstruction sequences are made simple and compact enough that sufficient complexity is required in the instruction decoding logic that it is feasible to custom-configure a gate array to perform instruction decoding. The resultant gate array, by virtue of being embodied in a single integrated circuit, is extremely fast and compact and has low power requirements.

7 Claims, 4 Drawing Figures

0 INDICATES LOW LEVEL
1 INDICATES HIGH LEVEL

| mnem | num. | O E A G | P A I S | L I / N O | I L E F | IIIIIIIIIIIIII 0123456789111111 012345 | AAAAAAAAA 012345678 | E A G | N O V | S I S | C I S | XX 01 |
|---|---|---|---|---|---|---|---|---|---|---|---|---|
| XNISZ | 001 | 0 | 0 | X | X X | 100XX11000111001 | 000000000 | 0 | 1 | 1 | 1 | 13,14 |
| XPEF  | 002 | 0 | 0 | X | X X | 100XX11000101001 | 000000001 | 0 | 1 | 1 | 1 | 13,14 |
| XPSHJ | 003 | 0 | 0 | X | X X | 100XX11000011001 | 000000010 | 0 | 1 | 1 | 1 | 13,14 |
| XCALL | 004 | 0 | 0 | X | X X | 100XX11000001001 | 000000011 | 0 | 1 | 1 | 1 | 13,14 |
| UITO  | 005 | 0 | 0 | X | X X | 100XX11001111001 | 000000100 | 0 | 1 | 1 | 1 | (13,14) |
| UITO  | 006 | 0 | 0 | X | X X | 100XX11001101001 | 000000101 | 0 | 1 | 1 | 1 | (13,14) |
| STATS | 007 | 0 | 0 | X | X X | 100XX11001011001 | 000000110 | 0 | 1 | 1 | 1 | (13,14) |
| LDATS | 008 | 0 | 0 | X | X X | 100XX11001001001 | 000000111 | 0 | 1 | 1 | 1 | (13,14) |
| WXORI | 009 | 0 | 0 | X | X X | 100XX11010111001 | 000001000 | 0 | 1 | 1 | 1 | 00 |
| WIORI | 010 | 0 | 0 | X | X X | 100XX11010101001 | 000001001 | 0 | 1 | 1 | 1 | 00 |
| WANDI | 011 | 0 | 0 | X | X X | 100XX11010011001 | 000001010 | 0 | 1 | 1 | 1 | 00 |
| WADDI | 012 | 0 | 0 | X | X X | 100XX11010001001 | 000001011 | 0 | 1 | 1 | 1 | 00 |
| LWDSZ | 013 | 0 | 0 | X | X X | 100XX11011111001 | 000001100 | 0 | 1 | 1 | 1 | 13,14 |
| LWISZ | 014 | 0 | 0 | X | X X | 100XX11011101001 | 000001101 | 0 | 1 | 1 | 1 | 13,14 |
| LNDSZ | 015 | 0 | 0 | X | X X | 100XX11011011001 | 000001110 | 0 | 1 | 1 | 1 | 13,14 |
| LNISZ | 016 | 0 | 0 | X | X X | 100XX11011001001 | 000001111 | 0 | 1 | 1 | 1 | 13,14 |
| XWDSZ | 017 | 0 | 0 | X | X X | 101XX11000111001 | 000010000 | 0 | 1 | 1 | 1 | 13,14 |
| XPEFB | 018 | 0 | 0 | X | X X | 101XX11000101001 | 000010001 | 0 | 1 | 1 | 1 | 13,14 |
| XWSIZ | 019 | 0 | 0 | X | X X | 101XX11000011001 | 000010010 | 0 | 1 | 1 | 1 | 13,14 |
| XNDSZ | 020 | 0 | 0 | X | X X | 101XX11000001001 | 000010011 | 0 | 1 | 1 | 1 | 13,14 |
| STASL | 021 | 0 | 0 | X | X X | 101XX11001111001 | 000010100 | 0 | 1 | 1 | 1 | (13,14) |
| LDASL | 022 | 0 | 0 | X | X X | 101XX11001101001 | 000010101 | 0 | 1 | 1 | 1 | (13,14) |
| STASP | 023 | 0 | 0 | X | X X | 101XX11001011001 | 000010110 | 0 | 1 | 1 | 1 | (13,14) |
| LDASP | 024 | 0 | 0 | X | X X | 101XX11001001001 | 000010111 | 0 | 1 | 1 | 1 | (13,14) |
| WSALM | 025 | 0 | 0 | X | X X | 101XX11010111001 | 000011000 | 0 | 1 | 1 | 1 | 00 |
| WSANM | 026 | 0 | 0 | X | X X | 010XX11010101001 | 000011001 | 0 | 1 | 1 | 1 | 00 |
| WSALA | 027 | 0 | 0 | X | X X | 101XX11010011001 | 000011010 | 0 | 1 | 1 | 1 | 00 |
| WSANA | 028 | 0 | 0 | X | X X | 101XX11010001001 | 000011011 | 0 | 1 | 1 | 1 | 00 |
| LPEF  | 029 | 0 | 0 | X | X X | 101XX11011111001 | 000011100 | 0 | 1 | 1 | 1 | 13,14 |
| LJSR  | 030 | 0 | 0 | X | X X | 101XX11011101001 | 000011101 | 0 | 1 | 1 | 1 | 13,14 |
| LJMP  | 031 | 0 | 0 | X | X X | 101XX11011011001 | 000011110 | 0 | 1 | 1 | 1 | 13,14 |
| LCALL | 032 | 0 | 0 | X | X X | 101XX11011001001 | 000011111 | 0 | 1 | 1 | 1 | 13,14 |
| NADDI | 033 | 0 | 0 | X | X X | 110XX11000111001 | 000100000 | 0 | 1 | 1 | 1 | 00 |
| NLDAI | 034 | 0 | 0 | X | X X | 110XX11000101001 | 000100001 | 0 | 1 | 1 | 1 | 00 |
| XJSR  | 035 | 0 | 0 | X | X X | 110XX11000011001 | 000100010 | 0 | 1 | 1 | 1 | 13,14 |
| XJMP  | 036 | 0 | 0 | X | X X | 110XX11000001001 | 000100011 | 0 | 1 | 1 | 1 | 13,14 |
| STAFP | 037 | 0 | 0 | X | X X | 110XX11001111001 | 000100100 | 0 | 1 | 1 | 1 | 00 |
| LDAFP | 038 | 0 | 0 | X | X X | 110XX11001101001 | 000100101 | 0 | 1 | 1 | 1 | 00 |
| STASB | 039 | 0 | 0 | X | X X | 110XX11001011001 | 000100110 | 0 | 1 | 1 | 1 | (13,14) |
| LDASB | 040 | 0 | 0 | X | X X | 110XX11001001001 | 000100111 | 0 | 1 | 1 | 1 | (13,14) |
| WULEI | 041 | 0 | 0 | X | X X | 110XX11010111001 | 000101000 | 0 | 1 | 1 | 1 | 00 |
| WASHI | 042 | 0 | 0 | X | X X | 110XX11010101001 | 000101001 | 0 | 1 | 1 | 1 | 00 |
| WUGTI | 043 | 0 | 0 | X | X X | 110XX11010011001 | 000101010 | 0 | 1 | 1 | 1 | 00 |
| WLDAI | 044 | 0 | 0 | X | X X | 110XX11010001001 | 000101011 | 0 | 1 | 1 | 1 | 00 |
| LPEFB | 045 | 0 | 0 | X | X X | 110XX11011111001 | 000101100 | 0 | 1 | 1 | 1 | 13,14 |

FIG. 2

| CLASS | | OP CODE | 9 BIT ENCODING "^" INVERT "." AS IS | SET | INDEX BITS |
|---|---|---|---|---|---|
| 1 | xx | 1xxxx0——————1001 | 001 ... .^^ | EGL | I1,I2 |
| 2 | xx | 1——xx100————1001 | 000 ... .^^ | EGL | I3,I4, IF ^(I1*I2+I8*I9+ |
| 3 | xx | 1——00111————1001 | 011 ... .^^ | EGL | 00    I1*^I8*I10) |
| 4 | xx | 1xxxx0—————01000 | 010 1.. .^^ | ECL | I1,I2 |
| 5 | xx | 1xxxx———————011000 | 010 1.. .^^ | EGL | I1,I2,IF ^I5 ELSE I3,I4 |
| 6 | xx | 1xxxx———————xx0xxx | 010 0.. .^^ | NOV | 00 |
|   | xx | 1xxxx———————xxx1xx | 010 0.. .^^ | NOV | 00 |
|   | xx | 1xxxx———————xxxx1x | 010 0.. .^^ | NOV | 00 |
| 7 | xx | 1xxxx100————1001 | 101 01. .^^ | EGL | 11,12 |
| 8 | xx | 1xxxx10—————01000 | 100 11. .^^ | ECL | 11,12 |
| 9 | xx | 1—————11111001000 | 100 10. .^^ | ECL | 00 |
| 10 | xx | 1—————11010101000 | 101 00. .^^ | ECL | 00 |
| 11 | -x | 1xxxx10111——1001 | 100 011 .^^ | EGL | 00 |
| 12 | xx | 1——xx11-11111000 | 111 001 .^^ | ECL | 00 |
| 13 | xx | 000—xxxxxxxxxxx | 111 111 0^^ | NOV | 16,17 |
|    | xx | 001xxx——xxxxxxxx | 111 111 1^^ | NOV | 16,17 |
| 14 | xx | 11——11110101000 | 100 000 .^^ | ECL | 00 |
| 15 | xx | 11——11011101000 | 100 001 .^^ | ECL | 00 |
| 16 | xx | 1xxxx1010———1001 | 100 010 .^^ | EGL | 11,12 |
| 17 | 00 | 011xx——xxxx0xx0 | 111 000 .^^ | NOV | 00 |
|    | 00 | 011xx——xxxx1101 | 111 000 .^^ | NOV | 00 |
|    | 00 | 011xx——xx101xxx | 111 000 .^^ | NOV | 00 |
|    | 00 | 011xx——xx0x00xx | 111 000 .^^ | NOV | 00 |
|    | 00 | 011xx——xx1xx00x | 111 000 .^^ | NOV | 00 |
|    | 00 | 011xx——xxxx101x | 111 000 .^^ | NOV | 00 |
|    | 00 | 011xx——xxx0x11x | 111 000 .^^ | NOV | 00 |
|    | 00 | 011xx——xx01xxxx | 111 000 .^^ | NOV | 00 |
|    | 00 | 011xx——xxx10xxx | 111 000 .^^ | NOV | 00 |
|    | 00 | 011xx——xxx1xxx0 | 111 000 .^^ | NOV | 00 |
| 8 | 00 | 011xx——xx00100x | 111 010 .^^ | NOV | 00 |
| 19 | 00 | 011xx——xx000101 | 111 011 .^^ | NOV | 00 |
| 20 | 00 | 011xx——xx001100 | 111 100 .^^ | NOV | 00 |
| 21 | 00 | 011xx——xx100011 | 111 101 .^^ | NOV | 00 |
| 22 | 00 | 011xx——xx100101 | 111 110 .^^ | NOV | 00 |
| 23 | 00 | 011xx000—111111 | 110 011 1^^ | NOV | 00 |
| 24 | 00 | 011xx011—111111 | 110 100 0^^ | NOV | 00 |
| 25 | 00 | 011xx1—xx111111 | 110 100 1^^ | NOV | 00 |
| 26 | xx | 10-xx1100-101000 | 110 101 0^^ | ECL | 00 |
| 27 | xx | 1xxxx10110—1001 | 110 101 1^^ | EGL | 00 |
| 28 | xx | 11-xx1xx0-111000 | 110 110 0^^ | ECL | 16,17 |
| 29 | xx | 100—1xx00111000 | 110 110 1^^ | ECL | 16,17 |
| 30 | xx | 11-xx1100-101000 | 110 111 0^^ | ECL | 00 |
| 31 | xx | 1xxx1111—xx1001 | 110 111 1^^ | EGL | 00 |
| 32 | xx | 1xxxx1100-001000 | 110 011 00^ | ECL | 00 |
| 33 | xx | 1xxxx1110-101000 | 110 011 01^ | ECL | 00 |
| 34 | xx | 10-xx11011101000 | 110 010 10^ | ECL | 13,14 |
| 35 | xx | 1xxxx1101-0010000 | 110 010 11^ | ECL | 00 |
| 36 | xx | 101xx1xx0-11100 | 110 010 00^ | ECL | 16,17 |

FIG. 3

DIGITAL COMPUTER HAVING UNIQUE INSTRUCTION DECODING LOGIC

BACKGROUND OF THE INVENTION

This invention relates generally to digital computers, and more particularly to instruction decoding in microcode-controlled digital computers. U.S. patent application Ser. No. 441,967, filed Nov. 15, 1982 and assigned to common assignee Data General Corporation is incorporated herein by reference.

Designers of such computers are generally faced with the problem of designing means for decoding or "cracking" each instruction in order to determine the starting address in a control store of a sequence of microinstructions that will effect the operations specified by the instruction. Historically, this has involved a design tradeoff between the size and complexity of the control store on the one hand, and the size and complexity of the cracking logic on the other.

One extreme of the prior art approach to this tradeoff would be to have no cracking logic at all, but to use the instruction directly as the address of the microinstruction sequence; under this approach, a machine using an n-bit instruction would require a control store with at least $2^n$ locations.

The other extreme of the prior art approaches the "hard-wired" machine which has no control store, and in which control of the operational circuit elements is effected entirely by the instruction-cracking logic circuits; as this extreme is approached the advantages of a microcode-controlled machine, such as ease of altering the machine's characteristics, are lost.

Designers of microcode-controlled machines have worked somewhere between those two extremes, and in recent years have benefitted to some extent from use of integrated circuit technology for constructing cracking logic. Nevertheless, serious problems to operating speed and overall performance still remain. In the prior art trend to reduce the overall size of their machines, attempts to decrease the size and complexity of the control store have been limited by the corresponding increased size of cracking logic built of conventional off-the-shelf integrated circuits.

The present invention offers a solution to these drawbacks and disadvantages of the prior art.

SUMMARY OF THE INVENTION

The present invention employs a gate array, embodied in a single integrated circuit packaged in a single encapsulation, to perform decoding of each instruction in order to produce the address within a control store of a sequence of microinstructions that will control a computer in performing the operations specified by that instruction.

It is advantageous to employ the present invention: the aforementioned design tradeoff is worked to advantage by designing a machine requiring sufficient complexity in the instruction cracking logic that it becomes economically feasible to procure custom-configured gate arrays embodying all the gating necessary to translate instructions into control store addresses. The initial costs of procuring and configuring off-the-shelf gate arrays are significantly less than the costs of custom-fabricating integrated circuits, yet the resultant gate array occupies only a single DIP (dual inline package). Under this approach, reductions in the size and complexity of the control store actually result in reductions in the size, complexity, and cost of the cracking logic, running directly counter to the historical limitations.

Additional benefits are inherently realized in the use of the present invention: circuit delays inherent in instruction cracking are minimized; power consumption is reduced.

Therefore, it is an object of the present invention to provide an improved digital computer.

It is another object of the present invention to provide a microcode-controlled digital computer in which the instruction cracking logic and the control store occupy minimum space.

It is a further object of the present invention to provide a microcode-controlled digital computer in which the cracking logic and control store have minimum cost.

It is yet another object of the present invention to provide a digital computer in which instruction decoding is accomplished at high speed.

It is yet a further object of the present invention to provide a digital computer in which power consumption is reduced.

Other objects and advantages of the present invention will by understood by those of ordinary skill in the art, after referring to the detailed description of the preferred embodiments and the appended drawings wherein:

BRIEF DESCRIPTION OF THE DRAWINGS

FIG. 2 depicts the form of a truth table that a logic designer might use in designing the gating of an instruction cracker;

FIG. 3 depicts a scheme of grouping instructions to be decoded into classes.

DESCRIPTION OF THE PREFERRED EMBODIMENT

Since it is a common practice of computer manufacturers to produce "families" of computers with some measure of compatability between members of the family, the present invention has been embodied in a digital computer system in which it is employed to decode (crack) four sets of instructions from a family of related Data General Corporation computers:

NOVA ® instructions, having eight-bit operation codes,

ECLIPSE ® instructions of the Commercial Instruction Set (CIS), having eight-bit operation codes, ECLIPSE ® instructions of the Scientific Instruction Set (SIS), having eight-bit operation codes, ECLIPSE/MV family instructions, such as ECLIPSE MV/4000 ® instructions, having sixteen-bit operation codes.

The invention is embodied in a single encapsulation (a dual inline package, or DIP) to which are input the operation codes to be cracked. Cracking consists in producing a unique nine-bit number corresponding to each operation code, which may then be used as the address in a control store of a microinstruction or sequence of microinstructions that will control the processing elements of the computer in such a manner as to effect the operation specified by the instruction's operation code.

Figure 1:
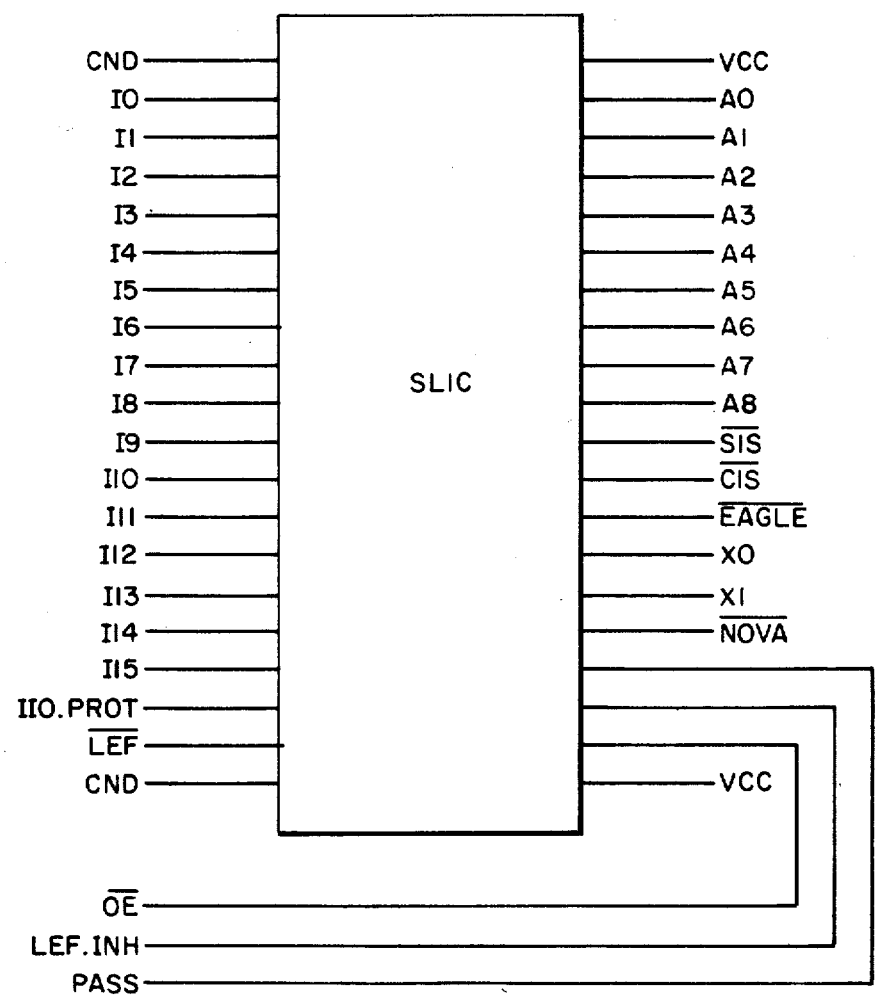
FIG. 1 depicts a DIP (dual inline package) containing the Single Level Instruction Cracker (SLIC) of the present invention and shows the numbering and significance of the pin connections.

FIG. 1 depicts the pin configuration of a DIP (dual inline package) housing the Single Level Instruction Cracker (SLIC) 101 of the present invention. The signal inputs are:

I0 through I15 16-bit operation code to be cracked. (Operation codes of fewer than 16 bits may be handled by connecting them to an appropriate number of these inputs)

IO.PROT Indicates that I/O protection is on.

LEF Indicates that LEF mode (Load Effective Address mode, denoting that address indirection and indexing are to be resolved prior to loading the addresses specified by an instruction) is on.

LEF.INH Forces LEF mode off

OE Output Enable

PASS Pass inputs directly through to outputs (for diagnostic purposes).

The signal outputs are:

A0 through A8 9-bit decoded address

X0, X1 Index bits (from operation code)

$\overline{CIS}$ ECLIPSE ® CIS instruction $\overline{SIS}$ ECLIPSE ® SIS instruction $\overline{EAGLE}$ MV/ family instruction $\overline{NOVA}$ NOVA ® instruction FIG. 1 of the incorporated-by-reference application depicts the overall digital computer in which the present invention is embodied: Control Unit 104 is seen to contain Instruction Prefetch and Decode unit 114, which is shown in greater detail in FIG. 5 of the incorporated-by-reference application. An instruction to be cracked is fetched from memory and placed in Prefetch Register A 564 or Prefetch Register B 566, whence the contents of the instruction are presented to SLIC 580 via Prefetch Bus 568. SLIC's outputs, including the nine-bit number uniquely representing the instruction, are placed in SLIC Register 582. In this particular embodiment, the nine-bit number is supplied to Macroinstruction Decode Memory 584, where it is used as the address of a location that in turn contains the control store address of the requisite sequence of microinstructions. In alternative embodiments, the nine-bit number could be used directly as the control store address of the microinstruction sequence. The control store address is passed through Microinstruction Address Multiplexer 588 to Microinstruction Input Multiplexer 554 within Microsequencer 116, where it is used to access the sequence of microinstructions that will effect the operation specified in the current instruction. The general method of dispatching to microcode which then controls the machine is well known in the prior art.

FIG. 2 of the present application is provided for illustrative purposes and is a portion of the truth table related to SLIC. The entire truth table is not presented to enhance clarity of presentation. The column labeled "MNEM" contains the mnemonic code assigned to each instruction. The "NUM" column contains a number arbitrarily assigned to each instruction. The $\overline{OE}$, PAS, LIN, I/O, and $\overline{LEF}$ columns (note that the column labelling is presented vertically) denote the states of Output Enable, Pass, LEF.INH, I/O Protect, and Load Effective Address input signals, respectively. (An "X" in any column indicates that the state of a bit is immaterial to SLIC.) the I0 through I15 columns denote the sixteen-bit operation code assigned to each instruction. The A0 through A8 columns contain the unique nine-bit number that represents each instruction. The $\overline{EAG}$, $\overline{NOV}$, $\overline{SIS}$, and $\overline{CIS}$ columns denote which of the four sets an instruction belongs to. The X0 and X1 columns denote the state of the index bits: whether they are forced to 0's or are pass-throughs of bits from the operation code.

FIG. 3 of the present application is likewise provided for illustrative purposes and is a portion of a document that represents an intermediate step in reducing the invention to practice. The entire document is not presented to improve clarity of presentation. It shows how groups of operation codes are categorized into "classes". While a class may include more than one operation code, each operation code will fall into one class and one class only. The "CLASS" column contains a number assigned to each class. The "OP CODE" column shows two bit position indicating the states of the I/O Protection and LEF bits respectively, followed by a blank position followed by a representation of the sixteen-bit operation code: an "x" in a bit position indicates that the corresponding bit is immaterial to SLIC and is not passed through to the output; a "—" in a bit position indicates that the corresponding bit is immaterial to SLIC but is passed through to the output. The "9 BIT ENCODING" column shows the state of the output that will result for the indicated operation code; A "." indicates that the respective "—" bit from the operation code is passed through as is, while a " ∧ " indicates that it is passed through inverted. The "SET" column denotes which of the four sets the instruction belongs to. The "INDEX BITS" column indicates how the two index bits of the output are determined.

Because SLIC is embodied in a single chip thus minimizing the distances that electrons must travel, the elapsed time from stabilization of the input signals to stabilization of the output signals is typically less than than 35 nanoseconds.

One of ordinary skill in the art can, for any instruction set to be decoded, construct equivalents to FIG. 2 and FIG. 3 for purposes of practicing the invention.

Figure 4:
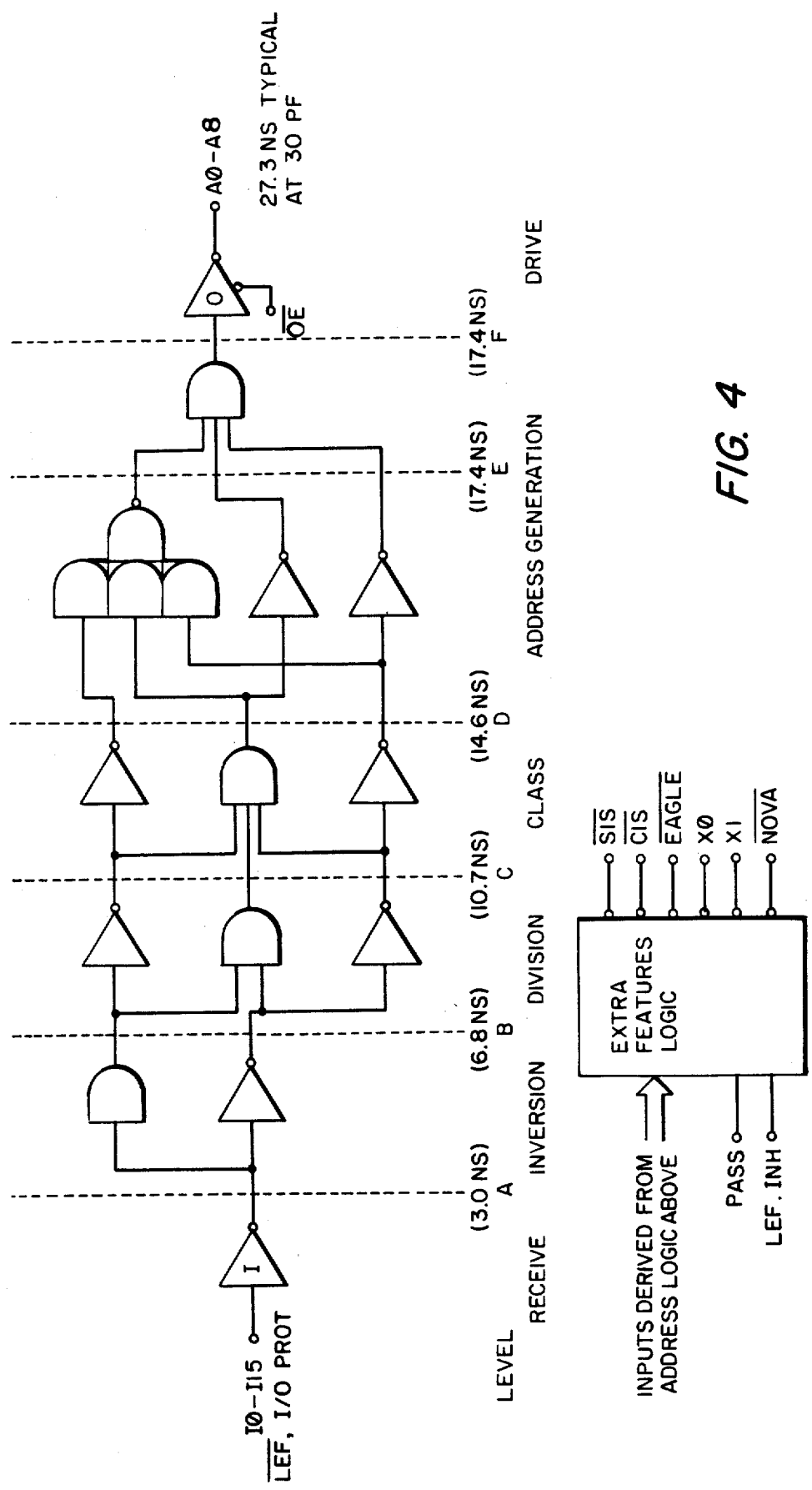
FIG. 4 depicts the overall design of the gating within the Single Level Instruction Cracker.

FIG. 4 of the present application is a flow diagram through the SLIC gating. Reading it from left to right shows that (1) operation code bits are received; (2) made available in both direct and inverted states; (3) divided or fanned out; (4) combined to identify an instruction's class; (5) classes are combined to produce a unique address corresponding to the instruction; and (6) the addresses are made available to subsequent portions of the computer.

Gating interconnections were devised in conformance with FIG. 4 reflecting the logic conveyed in FIGS. 2 and 3, and were implemented in a Fujitsu B500 gate array. The figure is provided for illustrative purposes only; complete logic diagrams are not necessary for full disclosure in view of the materials available from vendors of gate arrays.

The invention may be embodied in yet other specific forms without departing from the spirit of essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of increasing speed of instruction decoding in a microcode-controlled digital computer, comprising the steps of:

employing a gate array comprising on a single chip and in a single encapsulation the gating necessary to decode the operation code of an instruction; and, producing from said gate array the control store address of a sequence of microinstructions that will effect the operation specified by said instruction.

2. In an improved digital computer system having a main memory for storing instructions and data and a CPU responsive to said instructions for processing said data, said CPU including microcode control means which includes a control store containing a sequence of microinstructions corresponding to each one of said instructions for controlling operation of said CPU, the improvement comprising:

said microcode control means including instruction decoding means embodied in a gate array consisting of a single integrated circuit for obtaining from each instruction the control store address of said sequence of microinstructions corresponding to each of said instructions, whereby said control store address is rapidly obtained thereby facilitating operational speed of said digital computer system.

3. In the digital computer system of claim 2, said microcode control means including other means for obtaining from said each instruction said cntrol store address of said sequence of microinstructions corresponding to each of said instructions in no more than thirty-five nanoseconds.

4. In an improved digital computer system having a main memory for storing instructions and data and a CPU responsive to said instructions for processing said data, said CPU including microcode control means which includes a control store containing a sequence of microinstructions corresponding to each one of said instructions for controlling operation of said CPU, the improvement comprising:

said microcode control means including instruction decoding means embodied in a gate array consisting of a single integrated circuit for obtaining from each instruction the control store address of said sequence of microinstructions corresponding to each of said instructions, said microcode control means further including other means for obtaining from said each instruction said control store address of said sequence of microinstructions corresponding to each of said instructions in no more than thirty-five nanoseconds.

5. A method of increasing the speed of instruction decoding in a microcode-controlled digital computer, decoding being the generation of a control store address of a sequence of microinstructions corresponding to the instruction, each instruction comprising no more than a first number of bits, each instruction being a member of one class of instructions of a plurality of classes of instructions, the method comprising the steps of:

(a) determining the class of which an instruction to be decoded is a member;

(b) producing a first group of one or more specifier bits in response to the determination of the instruction's class, each class producing a unique first group;

(c) producing a second group of specifier bits, the number of bits in the second group being a second number, the second number being less than a third number by the number of bits in the first group, the third number being less than the first number, the second group of specifier bits being produced from a second number of the bits in the instruction (i) selecting, in response to the determination of the instruction's class, a second number of the bit positions of the instruction;

(ii) providing, in response to the determination of the instruction's class, first certain of the selected instructions bits as bits in the second group of specifier bits; and (iii) providing complements of the remaining selected instruction bits as bits in the second group of specifier bits; and (d) concatenating the first group of specifier bits and the second group of specifier bits to produce the control store address, the number of bits in the control store address being equal to the third number.

6. The method of claim 5 wherein the first number is sixteen.

7. The methof of claim 5 wherein the third number is nine.

* * * * *